United States Patent [19]
Marsh

[11] 4,085,573
[45] Apr. 25, 1978

[54] FARM CROP PICK-UP APPARATUS

[76] Inventor: Preston Marsh, Rte. 1, Hope, Mich. 48628

[21] Appl. No.: 674,955

[22] Filed: Apr. 8, 1976

[51] Int. Cl.[2] ............................................ A01D 89/00
[52] U.S. Cl. ...................................................... 56/364
[58] Field of Search ........................ 56/364, 16.4, 14.4, 56/14.5

[56] References Cited

U.S. PATENT DOCUMENTS

| | | | |
|---|---|---|---|
| 2,133,143 | 10/1938 | Innes | 56/364 |
| 2,491,739 | 12/1949 | LaDow | 56/364 |
| 3,766,725 | 10/1973 | Marsh | 56/364 |

FOREIGN PATENT DOCUMENTS

| | | | |
|---|---|---|---|
| 713,302 | 8/1954 | United Kingdom | 56/364 |

*Primary Examiner*—Jay N. Eskovitz

[57] ABSTRACT

Farm crop pick-up apparatus including a rotary pick-up assembly for lifting crop off the ground and an eccentrically mounted rotary stripper drum for stripping the crop from the pick-up assembly as the pick-up assembly and stripper drum rotate. The pick-up assembly is rotatably mounted on a shaft including a portion disposed internally of the drum mounting tines which protrude through the drum along the lower and forward portions of the drum and which retract along the upper and rearward portions of the drum so that the crop is stripped from the tines. The pick-up assembly shaft is driven from one end and the drum includes an annular mounting sleeve driven from the opposite end.

14 Claims, 4 Drawing Figures

37 F 10 29 12 14 64 33 65 2 62 35 31 40 48 49 51 48 51 49 40 15 60 46 44 42 52 61 58 28 50 50 25 45 47 36 38 47 23 24 22 a 32 20 32 38 55 54 13 44 26 36 49 36 56 27 36a 18 2

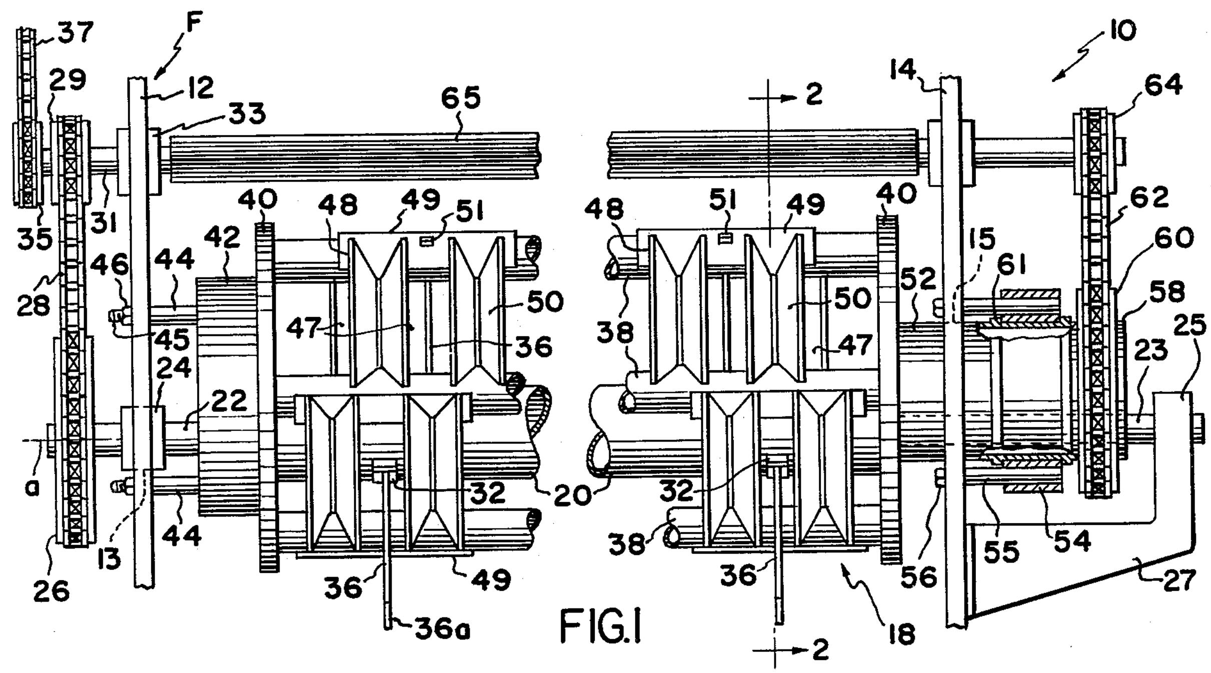
FIG.1
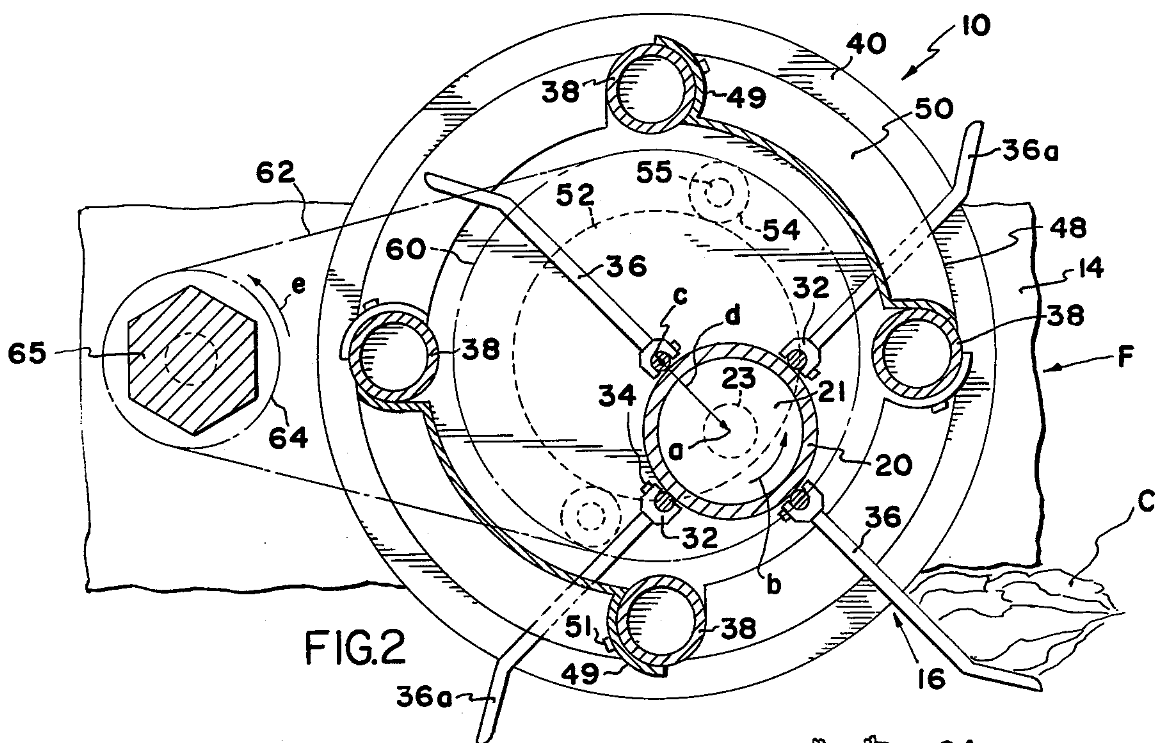
FIG.2
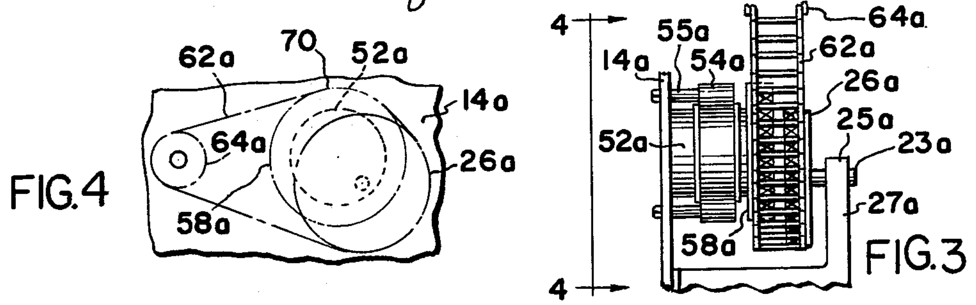
FIG.4
FIG.3

FARM CROP PICK-UP APPARATUS

BACKGROUND OF THE INVENTION

This invention relates to apparatus for handling severed farm crop and more particularly to new and improved apparatus for mounting and driving a rotary pick-up tine assembly and a rotary stripper drum mechanism.

Farm crop handling apparatus has been described in applicant's U.S. Pat. No. 3,766,725, granted Oct. 23, 1973, and applicant's U.S. Pat. No. 3,721,080 granted Mar. 20, 1973. The apparatus disclosed in U.S. Pat. No. 3,766,725 includes a drive strap or coupling straps disposed internally of a rotary stripper drum for drivably coupling a rotary pick-up tine assembly to a rotary stripper drum to drive the drum when the pick-up tine assembly is rotatably driven. Certain types of abrasive soil will tend to abrade and weaken the drive bands or straps. Accordingly, it is an object of the present invention to provide a pick-up assembly of the type described which includes a new and novel drive mechanism for driving the pick-up assembly and the stripper drum.

It is important that the stripper drum and pick-up tine assembly be positively driven in timed relation to preclude the tines from escaping to positions within the crop stripping drum or cylinder as more particularly described in the aforementioned U.S. Pat. No. 3,766,725, which is incorporated herein by reference. It is important that a positive drive force be applied to each of the drum and tine assembly so that the tines can be forced through the dirt to pick-up farm crop even though the crop may be partially embedded in the soil. The positive drive will force the tines through the soil.

It is another object of the present invention to provide farm crop lifting apparatus of the type described having a rotary pick-up tine assembly which is driven by a shaft at one end of the assembly and a rotary stripper drum mounted via an annular sleeve which receives the shaft and is driven from the opposite end.

It is another object of the present invention to provide farm crop lifting apparatus including a rotary tine assembly and a cooperating rotary stripper drum individually driven via endless members mounted in such a manner as to minimize entanglement of farm crop on the endless members.

It is yet another object of the present invention to provide farm crop pick-up apparatus of the type described including a rotary stripper drum disposed between a pair of side frame members and mounted at one end via an annular sleeve which passes through one of the side frame members and mounts a sprocket wheel disposed axially outwardly of the side frame member.

Still another object of the present invention is to provide pick-up apparatus of the type described including endless drive members coupled to opposite ends of apparatus for individually driving the tines assembly and the stripper drum.

A further object of the present invention is to provide a single endless drive member drivingly coupled to the pick-up assembly and drivingly coupled to the stripper drum for driving the pick-up assembly and the stripper drum in timed relation.

Other objects and advantages of the present invention will become apparent to those of ordinary skill in the art as the description thereof proceeds.

SUMMARY OF THE INVENTION

Farm crop pick-up apparatus comprising a movable support frame, crop lifting mechanism rotatably mounted on the frame for lifting crop off the ground, a rotary stripper drum for stripping the crop from the crop lifting mechanism as the crop lifting mechanism and the stripper drum rotate, annular end support flange members mounting the stripper drum for rotation on the frame, a mount member mounting the crop lifting mechanism for rotation on the frame; and a drive mechanism, drivingly coupled to the mount member and to at least one of the annular end support flange members for rotatably driving the crop lifting member and the stripping drum in timed relation.

The present invention may more readily be understood by reference to the accompanying drawings in which:

FIG. 1 is a top plan view illustrating apparatus constructed according to the present invention;

FIG. 2 is a sectional end view, taken along the line 2—2 of FIG. 1;

FIG. 3 is a top plan view illustrating a slightly modified construction; and FIG. 4 is a sectional side view taken along the line 4—4 of FIG. 3.

DESCRIPTION OF THE PREFERRED EMBODIMENT

Pick-up apparatus constructed according to the present invention is generally designated 10 and is particularly adapted for use with a crop windrowing machine of the type disclosed in the aforementioned U.S. Pat. No. 3,721,080. The frame of a typical windrowing machine is generally designated F and includes a pair of generally parallel, spaced apart, side frame members 12 and 14 which are movable with the windrowing apparatus in a forward path of travel.

The pick-up apparatus 10 includes a rotary pick-up assembly, generally designated 16, and a generally hollow rotary stripper drum assembly, generally designated 18. The pick-up assembly 16 includes a rotatable, tine mounting, support cylinder 20 having end plates 21 fixed to a reduced diameter drive shaft 22 and axially aligned, reduced diameter idler shaft 23. The side frame member 12 includes an aperture 13 mounting a bearing 24 journalling the rotary drive shaft 22 about its longitudinal axis *a*. The opposite side frame member 14 includes an enlarged aperture 15 receiving the idler shaft portion 23 which is journalled in bearings 25 mounted on the axially outer side of the other side frame member 14 via an L-shaped bracket 27. A sprocket wheel 26 is fixed to the drive shaft 22 and is driven via a roller drive chain 28 for normally driving the pick-up assembly in the direction of the arrow *b* (FIG. 2) to pick-up crop and propel it rearwardly as the frame F and pick-up assembly 16 move forwardly with the windrowing machine. The drive chain 28 is also trained around a drive sprocket 29 fixed to a shaft 31 journalled in the side frame members 12 and 14 via bearings 33. The shaft 31 mounts a sprocket wheel 35 driven via an input drive chain 37.

The tine mounting cylinder 20 mounts a plurality of tines 36 which are longitudinally disposed in rows on the support cylinder 20. The tines of each row are longitudinally staggered relative to the tines of an adjacent row to facilitate crop pick-up. The tines 36 are mounted on the cylinder 20 via clevis members 32 and removable locking pins 34. The radially outer ends **36*a* of the tines 36** are angled forwardly in the direction of rotation represented by the arrow *b*.

The stripper drum assembly 18 includes a plurality of longitudinally extending mounting rods 38 spanning a pair of annular end plates 40. Connected to each of the parallel mounting rods 38 of the stripper drum 18 is a plurality of longitudinally spaced, circumferentially extending trough sections 48 including curved mounting plates 49 secured to the rods 38 by a plurality of bolts 51 threadedly received in suitable tapped openings provided in the rods 38. Each trough section 48 mounts a pair of circumferentially extending, curvilinear, V-shaped trough members 50 which are more particularly described in the aforementioned U.S. Pat. No. 3,766,725 and incorporated herein, by reference as though fully set forth herein. Openings 47 are provided between the trough members 50 for receiving the pick-up tines 36.

One of the stripper drum end plates 40 includes an annular, axially extending flange 42 rotatably supported by a plurality of circumferentially spaced, roller bearing members 44 which are journalled on support bolts 45 that are connected to the frame member 12 by nuts 46.

The other side frame member 14 includes an opening 15 axially aligned with the opening 13 in the side frame member 12 for receiving a slightly reduced diameter, annular, axially extending flange 52 fixed to the annular end plate 40 at the opposite ends of the stripper drum 18. The annular flange 52 is rotatably supported on a plurality of circumferentially spaced roller bearing members 54 which are journalled on support bolts 55 that are mounted to the axially outer side of the end frame member 14 by nuts 56. The axially extending, annular flange 52 is axially longer than the flange 42 and includes an axially outer drive portion 58 mounting a sprocket wheel 60 which is driven via a drive chain 62 trained therearound as well as a drive sprocket 64 mounted on the shaft 31 axially outwardly of the side wall 14. The drive chain 62 will drive the stripper drum 18 in the direction of the arrow *b* about the longitudinal axis *c* of the stripper drum 18 in timed relation with rotation of pick-up assembly 16. As is illustrated in the drawings, the pick-up drum assembly axis *a* is spaced by a distance *d* from the axis *c* of the drum assembly. The shaft 22 is thus eccentrically positioned relative to the drum 18 so that the tines 36 project unequal distances through the openings 47 between the trough 50 at different points in their course of rotation about the axis *a*.

As the tines 36 are rotated, crop C is lifting and transferred rearwardly. As the tines 36 negotiate the upper half of the stripper drum 18, they will be retracted inwardly relative to the drum 18 so that the crop C is deposited on the stripper assembly troughs 50. The stripper assembly will propel the crop C rearwardly onto a hexagonally shaped roller 65 mounted on the input shaft 31, interjacent the side frame members 12 and 14. The hexagonally shaped roller 65 is driven in the direction of the arrow *e* (FIG. 2) to propel the crop C rearwardly into the windrowing machine. When the pick-up assembly and stripper drum 18 are rotated, the tines 36 follow a path which is eccentric relative to the path of the drum 18 so that the tines 36 will protrude to the maximum length along the front and lower side of the drum assembly 18 as viewed in FIG. 2 to pick-up the crop C and carry it around the stripper drum assembly 18 and then be retracted inwardly through the slots 47 in the stripper drum assembly along the top and rear sides thereof to deposit the crop on the stripper drum 18.

The sprocket wheels 60 and 26 are the same diameter and have the same number of teeth. Likewisely the sprocket wheels 29 and 64 are the same diameter and have the same number of teeth. Thus, the tine assembly and the stripper drum are driven in timed relation so that the tines 36 remain in the circumferential positions illustrated in FIG. 2 relative to the positions of the stripper drum mounting rods 38, as illustrated in FIG. 2.

As is illustrated in FIG. 1, the pick-up tine assembly idler shaft 23 and the pick-up assembly drive shaft 22 extend axially outwardly beyond the stripper drum annular flanges 42 and 52 respectively. It is important that the sprocket wheels 26 and 60 be disposed axially outwardly of the side frame members 12 and 14 respectively to minimize the abrasive effects of dirt and the effects of grain wrapping around or entangling the sprocket wheels and chains 28 and 62. Axial movement of the stripper drum 18 is prevented by radial flanges 61 mounted on the outside of the annular flange 52 and bearing against opposite ends of roller bearing members 54.

It is also important to note that the drum 18 is driven from one end via the sprocket wheel 60 whereas the tine assembly is driven from the opposite end via the sprocket wheel 26. The bearings 25 for the shaft 23 are disposed axially outwardly of the sprocket wheel 60 and the outer end 58 of the sleeve 52.

THE OPERATION

The input shaft 31 is driven via an input chain 37 trained around a sprocket wheel 35 fixed to the shaft 31. The tine assembly drive chain 28 will drive the tine mounting shaft 22 and the pick-up tine assembly 16 in the direction of the arrow *b* whereby the pick-up tines 36 will lift the scattered crop C off the ground and move it rearwardly or around the upper portion of the stripper drum assembly 18. At this same time, the stripper drum drive chain 62 will drive the stripper drum assembly 18 about its axis *c* in the direction of the arrow *b* via the sprocket wheel 60. Because the tine assembly 16 is rotatable about an axis *b* offset from the axes *c* of the stripper drum 18, the tines 36 move in an eccentric path of travel relative to the circular path of movement of the stripper drum 18 so as to be retracted through the slots 47 along the top and rear portions of the drum assembly 18 to deposit the scattered crop thereon. The rotating drum 18 propels the crop deposited thereon rearwardly onto the hexagonal roller 65 which in turn propels the crop rearwardly for further processing.

ALTERNATE EMBODIMENTS

Referring now more particularly to FIGS. 3 and 4 a slightly modified construction is illustrated and identical parts will be identified with identical numerals followed by the letter *a*. The apparatus illustrated in FIGS. 3 and 4 is identical to the structure illustrated in FIGS. 1 and 2 except that the sprocket wheel **26*a* is mounted on the shaft portion 23*a* adjacent the stripper drum drive sleeve 52 instead of the shaft 22 as illustrated in FIG. 1. Also, the drive chain 28 is eliminated and the stripper drum drive chain 62*a* is substantially wider than the chain 62 and also drives the pick-up tine assembly. The drive chain 62*a* is of a width sufficient to drive both a sprocket wheel 58*a* fixed to the annular sleeve 52*a* as well as a sprocket wheel 26*a* fixed to the shaft 23*a*. The width of the sprocket wheel 64*a* is twice the width of the sprocket wheel 64 and extends substantially the full width of the roller chain 62a. The roller chain 62a only tangentially engages the sprocket wheel 58a as illustrated at 70. The diameters of the sprocket wheels 58a and 26a remain the same as that described in the embodiment illustrated in FIG. 1 and thus the tine assembly 16 and the stripper assembly 18** are driven in unison.

It should be understood that another embodiment (not shown) is identical to that illustrated in FIG. 1 except that the drive sprocket 64 is eliminated and a sprocket wheel identical to sprocket wheel 26a (FIG. 3) is provided as described in relation to FIGS. 3 and 4. A chain, which is identical to chain 62a except for being shorter in length, is trained around the sprocket wheel 26a and the sprocket wheel 60. When the drive chain 28 drives one end of the tine assembly 10 to rotate the tine assembly about its axis, the chain 62a will drive the opposite end of the stripper assembly to rotate the stripper assembly about its axis.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What I claim is:

1. Farm crop handling apparatus for handling severed farm crop deposited on the ground comprising:

portable frame support means movable in a path of travel;

longitudinally extending, rotary, crop pick-up means mounted on said frame support means for movement therewith and for rotation thereon about a longitudinal axis, transverse to said path of travel, for lifting crop off the ground and propelling it in a direction opposite to the path of travel of said frame support means;

generally cylindrical, generally hollow, longitudinally extending crop stripping means rotatable about its longitudinal axis for stripping the crop from said crop lifting means when said crop pick-up means and said crop stripping means are rotated;

said crop stripping means including a plurality of longitudinally spaced openings;

said crop pick-up means including support means disposed interiorly of said stripping means, and a plurality of radially outwardly extending, circumferentially and longitudinally spaced pick-up tines on said support means successively movable in said openings between radially outer positions to pick-up crop and radially inner positions to deposit the picked up crop on said crop stripping means as said crop pick-up means and crop stripping means are rotated;

means for rotatably driving said crop pick-up means and said stripping means in timed relation including:

a first drive means coupled to one end of said pick-up means for rotatably driving said pick-up means about its axis; and a second drive means, independent of said first drive means, coupled to said stripping means adjacent the opposite end of said pick-up means for rotatably driving said stripping means in timed relation with rotation of said pick-up means;

axially extending annular mount means on one end of said stripping means adjacent said opposite end of said pick-up means;

said frame support means including a first axially extending opening therethrough receiving said annular mount means;

said stripping means being disposed on one axial side of said opening;

said annular mount means including a drive portion on the axially opposite side of said opening coupled to said second drive means.

2. The apparatus as set forth in claim 1 wherein said crop pick-up means includes a second drive portion extending axially outwardly beyond the opposite end of said stripper means, said frame means including a second opening, axially aligned with said first opening, receiving said second drive portion, said second drive means being drivingly coupled to said second drive portion axially outwardly of said frame means and second opening.

3. Farm crop pick-up apparatus for picking up crop on the ground of a field comprising:

a movable frame adapted to forwardly move through a field including a pair of spaced apart side frame members;

a rotatable tine assembly rotatable on said frame about its axis for lifting farm crop off the ground and propelling it rearwardly;

a rotatable, generally cylindrical, hollow, stripper member rotatable on said frame about an axis for stripping the lifted crop from said tine assembly and propelling it rearwardly as said tine assembly and said stripper member rotate;

means journalling said tine assembly for rotation about its axis;

a first drive member coupled to one end of said tine assembly adjacent one of said side frame members;

means journalling said stripper member for rotation on said side frame members; and a second drive member drivingly coupled to said stripper member adjacent the other of said side frame members at the opposite end of said tine assembly;

said means journalling said stripper member on said frame including a generally cylindrical, axially extending sleeve at each end of said stripper member; means journalling said sleeves on said sidewalls, one of said sidewalls including an aperture therein receiving one of said sleeves;

said stripper member being disposed on one axial side of said aperture;

said one sleeve mounting a sprocket portion on the axially opposite side of said aperture;

said second drive member including an endless chain trained around said sprocket portion.

4. The apparatus as set forth in claim 3 wherein said stripper member has a plurality of axially and circumferentially spaced openings therein; said tine assembly includes support means having a first support portion disposed interiorally of said stripper member and eccentrically positioned relative to said stripper member, and a plurality of longitudinally and circumferentially spaced tines mounted on said support portion and a projecting through said openings at varying distances about the circumference of said stripper member.

5. The apparatus as set forth in claim 4 wherein a rotary shaft mounts said tine assembly on said frame members, the other of said side walls including an opening therein, said rotary shaft being received by the other of said sleeves and by said opening in said other side wall, said first drive member being coupled to said shaft axially outwardly of said other sidewall.

6. Farm crop handling apparatus for handling severed farm crop deposited on the ground comprising:

portable frame support means, including axially spaced apart, side frame members movable in a forward path, one of said side frame members having an opening therethrough;

rotary crop pick up means disposed axially inwardly of said side frame members, for picking up crop and propelling it rearwardly;

generally cylindrical, hollow, rotary crop stripping means, disposed between said side frame members, for stripping the crop from the pick-up means and moving it rearwardly when the crop pickup means and crop stripping means are rotated;

means mounting said crop stripping means for rotation on said frame support means including axially extending, axially aligned, annular flange means mounted to each end of said crop stripping means, one of said flange means being received in the opening in said one side frame member and including a drive portion disposed axially outwardly of said one side frame member and means mounting said crop pick-up means for rotation on said frame support means including drive shaft means received by the other of said flange means, said drive shaft means including a second drive portion disposed axially outwardly beyond said other flange means.

7. The apparatus as set forth in claim 6 wherein the other of said side walls includes a second opening therethrough in axial alignment with the opening in said one side wall, said second drive portion being received by said second opening and disposed axially outwardly of said other side wall.

8. Farm crop handling apparatus for handling severed farm crop deposited on the ground comprising:

a portable support frame movable in a forward path of travel;

a plurality of longitudinally extending, rotatable bearing means on said frame circumferentially spaced about a first axis;

a rotary, longitudinally extending stripper drum including openings spaced along the length of said drum;

annular end support flange means received on said bearing means mounting said drum for rotation on said frame about said first axis;

crop lifting means for lifting said crop off the ground and propelling it rearwardly;

mount means mounting said crop lifting means on said frame for rotation about a second axis, spaced from said first axis but within the peripheral extent of said annular flange means, in a path so that a portion thereof will protrude through said slots along the front and lower portion of the drum to pick-up crops and carry them partially around said stripper drum and retract through said slots along the top and rear portions of the drum to deposit the crops on the stripper drum; and drive means, drivingly coupled to said mount means and drivingly coupled to said annular end support flange means for rotatably driving said crop lifting means and said stripper drum in timed relation;

said mount means being disposed within the peripheral extent of said annular flange means, at least one end of said mount means extending axially outwardly beyond said flange means.

9. The apparatus as set forth in claim 8 wherein said bearing means is axially disposed between said frame and said drive means.

10. The farm crop handling apparatus as set forth in claim 8 wherein said endless drive means comprises, a first endless drive member coupled to said mount means adjacent one end of said stripper drum, and a second endless drive member coupled to said flange means at the opposite end of said stripper drum.

11. The farm crop handling apparatus as set forth in claim 10 wherein said mount means comprises rotary shaft means rotatable about an axis substantially parallel to the said first axis and eccentrically positioned with respect thereto.

12. The farm crop handling apparatus as set forth in claim 11 wherein said support flange means comprises an annular support flange at each end of said stripper drum, said rotary shaft means including a shaft disposed radially interiorly and axially exteriorly of said support flanges.

13. The farm crop handling apparatus as set forth in claim 12 wherein said frame support means comprises forwardly extending, longitudinally spaced side frame members, said drum being disposed between said side frame members, said end support flange means including an annular end support flange, mounted to one end of said drum longitudinally inwardly of said side frame members but extending through one of said side frame members, said second endless drive means being drivingly coupled to a portion of said annular flange disposed longitudinally outwardly of said one frame member.

14. The farm crop handling apparatus as set forth in claim 11 wherein said support flange means comprises an annular support flange at each end of said stripper drum, said rotary shaft means including a shaft disposed radially interiorly of said support flanges and including axially opposite end portions disposed axially exteriorly of said support flanges.

* * * * *